No. 856,844. PATENTED JUNE 11, 1907.
W. L. CLIFTON.
CHURN.
APPLICATION FILED NOV. 16, 1905. RENEWED MAR. 8, 1907.
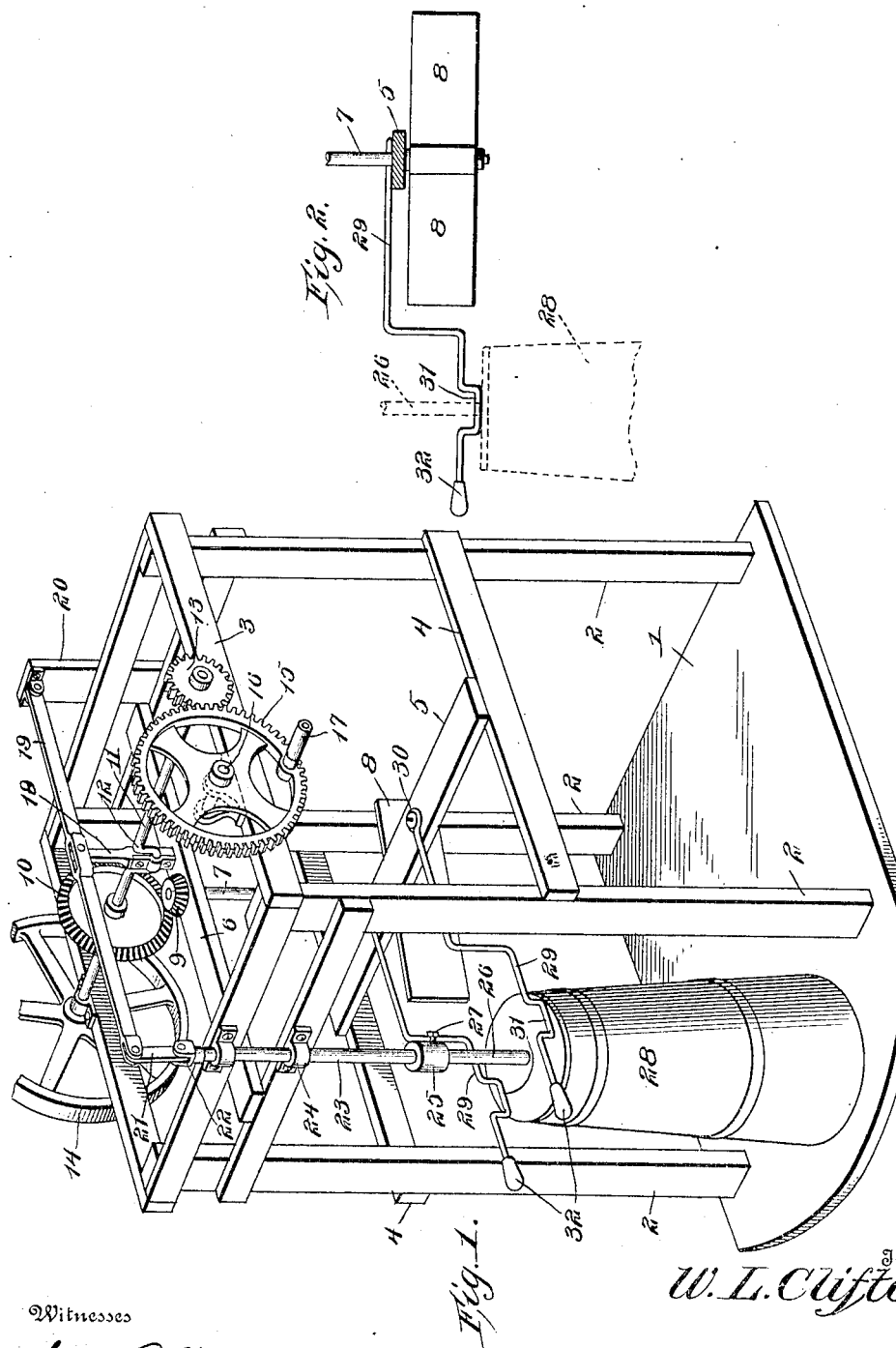
Witnesses
Louis R. Heinrichs
Herbert D. Lawson
Inventor
W. L. Clifton
By W. J. FitzGerald & Co.
Attorneys

UNITED STATES PATENT OFFICE.

WALTER LEE CLIFTON, OF PILOTMOUNTAIN, NORTH CAROLINA.

CHURN.

No. 856,844.  Specification of Letters Patent.  Patented June 11, 1907.

Application filed November 16, 1905. Renewed March 8, 1907. Serial No. 361,344.

*To all whom it may concern:*

Be it known that I, WALTER LEE CLIFTON, a citizen of the United States, residing at Pilotmountain, in the county of Surry and State of North Carolina, have invented certain new and useful Improvements in Churns; and I do hereby declare the following to be a full, clear, and exact description of the invention, such as will enable others skilled in the art to which it appertains to make and use the same.

My invention relates to churns and more particularly to power devices therefor. The object of the invention is to provide mechanism which can be easily operated manually or in any other desired manner so as to rapidly reciprocate a churn dasher.

A still further object is to provide means for agitating the air adjacent the churn so as to keep flies and other like insects away from it.

With the above and other objects in view the invention consists of a platform or base on which is mounted a frame which supports a crank shaft having a fly wheel thereon. A power wheel is also mounted on the frame and serves to rotate the crank shaft, and a lever is connected to the crank of the shaft and is actuated thereby, said lever being detachably connected to the churn dasher. Spring holding rods are connected to the frame and are adapted to bear upon the churn when the same is in position on the platform, and a fan is mounted adjacent the churn and has means for transmitting motion thereto from the crank shaft.

The invention also consists of certain other novel features of construction and combination of parts which will be more fully described and pointed out in the claims.

In the accompanying drawings I have shown the preferred form of my invention.

In said drawings—Figure 1 is a perspective view of my improved churn power, and Fig. 2 is an enlarged side elevation of the churn retaining rod, the position of the churn being indicated by dotted lines.

Referring to the figures by numerals of reference, 1 is a base or platform having uprights 2 extending from the corners thereof, the upper ends of said uprights supporting a frame 3. Side strips 4 are disposed above the base or platform and are connected by cross strips 5. Another cross strip 6 is mounted adjacent the frame 3, and within both of these cross strips is journaled a vertical shaft 7 having a fan 8 at its lower end. A gear 9 is located at the upper end of shaft 7 and meshes with a larger gear 10 which is secured to a shaft 11 journaled on frame 3. This shaft has a crank 12 at a point between its ends, and at opposite ends of the shaft are secured a gear 13 and a fly wheel 14, respectively. Gear 13 meshes with a drive gear 15 which is mounted on a stud shaft 16 extending laterally from frame 3. A grip 17 is secured to the drive gear 15 so that the same can be readily rotated manually. A link 18 is mounted on the crank 12 and projects and is pivoted within a lever 19 which is fulcrumed at one end of a standard 20 extending upward from frame 3. The other end of this lever 19 has a link 21 pivoted to it, and this link is pivoted within ears 22 formed at one end of a plunger 23 mounted within guides 24 secured to frame 3. A sleeve 25 extends downward from the lower end of plunger 23, and seated therein is one end of a churn dasher 26. This dasher is adapted to be locked in place by means of a set-screw 27. The churn 28 is held in proper position upon the base 1 by means of spring holding rods 29 which are pivoted to the cross bar 5, as shown at 30, and are provided with depressions 31 which bear on the churn top. Each rod 29 has a handle 32 whereby the same can be gripped and released or moved laterally.

After the churn 28 has been properly placed on platform 1, this dasher 26 is raised and inserted into the sleeve 25, after which it is locked by means of set-screw 27. Spring retaining rods 29 are then moved in position over the churn and are released so as to exert a constant pressure thereon. Gear 15 is then rotated manually, or in any other suitable manner, and motion will therefore be transmitted to shaft 11 through gear 13. Gear 10 will therefore rotate gear 9 and the fan 8, and link 18 will be raised and lowered by crank 12. The dasher 26 will be reciprocated and a thorough churning action produced.

This power can be utilized with any form of churn employing a reciprocating dasher, but while I have shown it constructed to be operated manually, it will be understood that the same can be driven by any suitable motor.

Having thus fully described my invention, what I claim as new and desire to secure by Letters Patent is:

The combination with a platform and a frame supported thereby; of independently movable, spring churn retaining rods pivotally mounted upon and adapted to swing laterally in relation to the frame, a plunger slidably mounted on the frame, means thereon adapted to receive and detachably engage a churn dasher, a lever fulcrumed at one end to the frame, a link connection between said lever and the plunger, a crank shaft mounted on the frame, a link connection between the crank shaft and the lever, and means for rotating the crank shaft.

In testimony whereof I have signed my name to this specification in the presence of two subscribing witnesses.

WALTER LEE CLIFTON.

Witnesses:
  J. H. CLIFTON,
  O. E. SNOW.